United States Patent
Merrick

(10) Patent No.: US 6,746,158 B2
(45) Date of Patent: Jun. 8, 2004

(54) PULL DETACH MECHANISM FOR FIBER OPTIC TRANSCEIVER MODULE

(75) Inventor: Stephen P. Merrick, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 165 days.

(21) Appl. No.: 10/066,068

(22) Filed: Jan. 31, 2002

(65) Prior Publication Data

US 2003/0142917 A1 Jul. 31, 2003

(51) Int. Cl.[7] .......................... G02B 6/36; H01R 13/62; H01R 11/22
(52) U.S. Cl. ............................. 385/53; 385/62; 385/76; 385/88; 24/605; 24/614; 292/137; 439/152; 439/258; 439/266; 439/370
(58) Field of Search ............................ 385/53–94, 139; 24/605, 604, 610, 614, 615, 629, 630; 292/DIG. 30, DIG. 61, 137, 145, 146; 439/151–160, 258, 266, 270, 310, 357, 370

(56) References Cited

U.S. PATENT DOCUMENTS

| | | | |
|---|---|---|---|
| 6,447,170 B1 * | 9/2002 | Takahashi et al. ............ | 385/53 |
| 6,485,322 B1 * | 11/2002 | Branch et al. ............... | 439/357 |
| 6,570,768 B2 * | 5/2003 | Medina ....................... | 361/747 |
| 2002/0142649 A1 * | 10/2002 | Baugh et al. ................ | 439/532 |
| 2003/0133667 A1 * | 7/2003 | Chiu et al. .................... | 385/53 |

\* cited by examiner

*Primary Examiner*—Akm Enayet Ullah
*Assistant Examiner*—Michelle R. Connelly-Cushwa

(57) ABSTRACT

A delatch mechanism includes wedges that reside in pockets adjacent to a post on a module when the module is latched in a cage. Pulling on a handle pulls the wedges out of the pockets so that the wedges rise and lift a tab. Pulling the delatch mechanism to a limit of its motion frees the post on the module from the tab, and further pulling transfers to the module to pull the module out of the cage. The delatch mechanism can include a spring system that returns the wedges to their pockets for latching, allows movement of the wedges relative to the module for lifting of the tab, and locks into the module to pull the module free of the cage. Handles for the latch mechanism can include a bail, a flexible tab, or fixed handle that is part of an integrated structure including the wedges.

14 Claims, 4 Drawing Sheets

PULL DETACH MECHANISM FOR FIBER OPTIC TRANSCEIVER MODULE

BACKGROUND

State-of-the-art digital communication switches, servers, and routers currently use multiple rows of duplex LC connector optical transceivers to meet information bandwidth and physical density needs. To be a commercially fungible product, the optical transceivers must have basic dimensions and mechanical functionality that conform to an industry standard Multi-Source Agreement (MSA) such as set forth in the Small Form Factor (SFF) committee's INF-8074i "SFP Transceiver" document. Many optical transceiver mechanical designs that comply with and add value beyond the basic mechanical functionally set forth in the MSA are possible.

FIG. 1 illustrates a standard configuration for a system 100 including a fiber optic transceiver module 110 and a cage 120. Fiber optic transceiver module 110 contains a transceiver that converts optical data signals received via an optical fiber (not shown) into electrical signals for an electrical switch (not shown) and converts electrical data signals from the switch into optical data signals for transmission. Cage 120 would typically be part of the switch and may be mounted in closely spaced rows above and below a printed circuit board.

When plugging module 110 into a switch, an operator slides module 110 into cage 120 until a post 114 on module 110 engages and lifts a latch tab 122 on cage 120. Module 110 then continues sliding into cage 120 until post 114 is even with a hole 124 in latch tab 122 at which point latch tab 122 springs down to latch module 110 in place with post 114 residing in hole 124. Post 114 is shaped such that an outward force on module 110 does not easily remove module 110 from cage 120.

Module 110 has a delatch mechanism 130, which resides in a channel extending away from post 114. In a latched position, delatch mechanism 130 is outside cage 120, and post 114 is in hole 124. To remove module 110, delatch mechanism 130 is slid toward cage 120 until wedges 132 on delatch mechanism 130 slide under and lift latch tab 122 to a level above post 114. Module 110 can then be slid out and removed from cage 120.

Operation of delatch mechanism 130 can be awkward since removal of module 110 requires pushing in on delatch mechanism 130 while pulling out module 110. Additionally, when module 110 is in an array of modules in an optical switch, modules above module 110 will often block easy access to delatch mechanism 130, making removal of module 110 more difficult. Surrounding modules also make each module more difficult to grip.

Other module delatch mechanisms have been developed in attempts to simplify the removal procedure. One such module has a flexible strip that is attached to the module and resides under the latch tab in the latched position. To delatch the module, an operator pulls up and out on the flexible strip, and the flexible strip lifts the latch tab off the post on the module. Releasing the latch tab and removing the module in this manner requires significant upward force. For many operators, the operation of this delatch mechanism is not intuitive since pulling directly out on the flexible tab will not release the module. Additionally, in a high-density configuration, surrounding modules can make the flexible tab difficult to grip.

Another "pull-to-detach" mechanism provides the module with a post on a lever arm and a flexible handle mounted to a rod. When the flexible handle is pulled, the rod forces the lever arm to rotate and lower the post away from the cage, releasing the module from the latch on the cage. The pulling force on the flexible handle then slides the module out of the cage. Return springs that hold the lever arm and the post in position are features molded into the plastic housing. This system requires an operator to apply a great deal of force to remove the module.

In view of the limitations of current systems, fiber optic transceiver modules need new types of delatch mechanisms that are intuitive to operate, do not require excessive force, and are easily accessible in high density module arrangements.

SUMMARY

In accordance with an aspect of the invention, a pulling on a delatch mechanism for an optical transceiver module lifts a latch tab off a post on the module before transferring pulling force to the module for removal. Accordingly, operation of the delatch mechanism is intuitive in that pulling directly out on the delatch mechanism pulls out the module.

One embodiment of the delatch mechanism includes one or more wedges that reside inside pockets adjacent the post on the module when the module is latched in a cage. A pulling force on a handle attached to the wedges pulls the wedges out of the pockets causing the wedges to rise and lift a latch tab. When the delatch mechanism moves to a limit of its range of motion, the latch tab is above the post on the module, and the pulling force transfers to the module to pull the module out of the cage. The delatch mechanism can include a spring system that returns the wedges to their respective pockets for latching, allows movement of the wedges relative to the module for lifting of the latch tab, and locks into the module to transfer pulling force to the module during removal. The delatch mechanism can employ a variety of handles including but not limited to a bail, a flexible tab, or a fixed tab, which can be easily accessed even in dense module arrays.

Another embodiment of the invention is a module assembly such as a fiber optic transceiver module assembly that includes a module body and a delatch mechanism. The module body includes a latch post and a pocket adjacent the latch post. The delatch mechanism includes a wedge with a top that is below the top of the latch post when the wedge is in the pocket. When the delatch mechanism is pulled from a first position to a second position, the wedge rises out of the pocket so that the top of the wedge is at or above the top of the latch post.

A spring system can be attached so that pulling the delatch mechanism from the first position to the second position compresses the spring system and transfers pulling force to the module body. One specific spring system uses spring arms having ends in notches on opposite sidewalls of a channel in the module body, and the spring arms and the wedge can be part of an integrated structure that slides along the channel.

Generally, a handle enables a user to pull the delatch mechanism. The handle can include a bail that is connected to an integrated structure including the wedge and/or one or more ridges for gripping when the bail is inconveniently located. Alternatively, the handle can include a flexible tab that is looped though an opening in the integrated structure, or a portion of the integrated structure that extends beyond the module body.

Another embodiment of the invention is a method for removing a fiber optic transceiver module from a cage. The method includes pulling a delatch mechanism from a first position to a second position relative to the module. Pulling the delatch mechanism to the second position moves a wedge causing the wedge to lift a tab on the cage to free a post on the module from a hole in the tab. In the second position, the delatch mechanism is fixed relative to the module so that the further pulling applies force to the module and removes the module from the cage.

BRIEF DESCRIPTION OF THE DRAWINGS

Use of the same reference symbols in different figures indicates similar or identical items.

DETAILED DESCRIPTION

In accordance with an aspect of the invention, pulling a delatch mechanism unlatches and removes a fiber optic transceiver module from a cage. In particular, pulling initially compresses a spring system in the delatch mechanism and pulls wedges out of pockets in the module. As the wedges rise out of their respective pockets, the wedges engage and lift a latch tab that is part of the cage. When the spring system is fully compressed, the wedges have lifted the latch tab free of a post that is part of the module, and further pulling on the handle slides the module out of the cage.

Figure 2A:
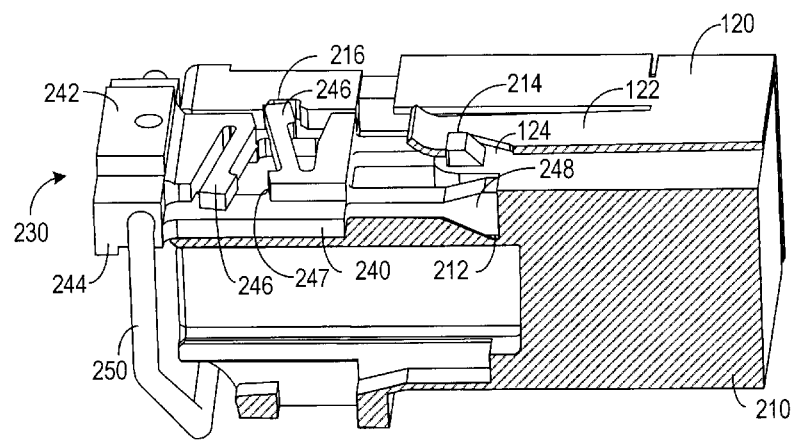
FIGS. 2A and 2B are cut-away, perspective views of portions of a fiber optic transceiver module with a delatch mechanism respectively in latched and unlatched positions in accordance with an embodiment of the invention.

FIG. 2A is a cut-away, perspective view of an exemplary system including a module 210, a cage 120, and a delatch mechanism 230 in a latched configuration. In FIG. 2A, half of cage 220 is cut away to better show module 210 and delatch mechanism 230, and part of module 210 is also cut away to better illustrate delatch mechanism 230. Standard features associated with optical fibers and transceivers in module 210 are simplified in the drawings to improve the clarity of the drawings.

Figure 1:
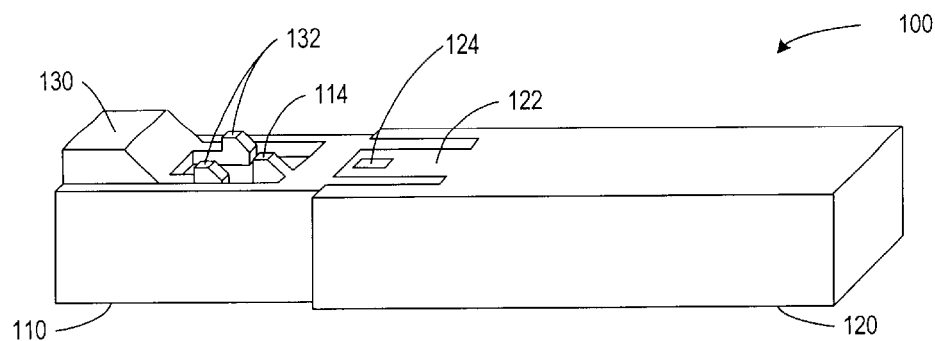
FIG. 1 is a perspective view of a fiber optic transceiver module with a conventional delatch mechanism.

Cage 120 can be a standard cage such as illustrated in FIG. 1 and generally complies with an MSA agreement such as SFF committee's INF-8074i "SFP Transceiver" document. In particular, cage 120 includes a latch tab 122 (half of which is shown in FIG. 2A) including a hole 124 that can accommodate a post 214 positioned according to the requirements of the pertinent MSA. Although FIG. 2A illustrates cage 120 as being isolated, cage 120 would typically be one of several substantially identical cages arranged in a dense array of cages. Such cages are well known in the art and are available commercially from suppliers such as Amp/Tyco International, Picolight Inc., or Molex Inc. Other known and suitable cage structures for module 210 can accommodate a row of (e.g., four) immediately adjacent modules.

Module 210 has dimensions in compliance with the pertinent MSA and differs from module 110 of FIG. 1 predominantly in that module 210 includes notches 216 and pockets 212 that accommodate portions of delatch mechanism 230. In one embodiment, module 210 is made of a metal such as zinc ZA8, which can be cast to create fine features necessary for delatch mechanism 230 and for fiber optic and electrical components (not shown) contained in module 210. Alternatively, module 210 can be injection molded using a high temperature thermal plastic material such as one of materials from the Ultem family of plastics from General Electric, Co.

Figure 2B:
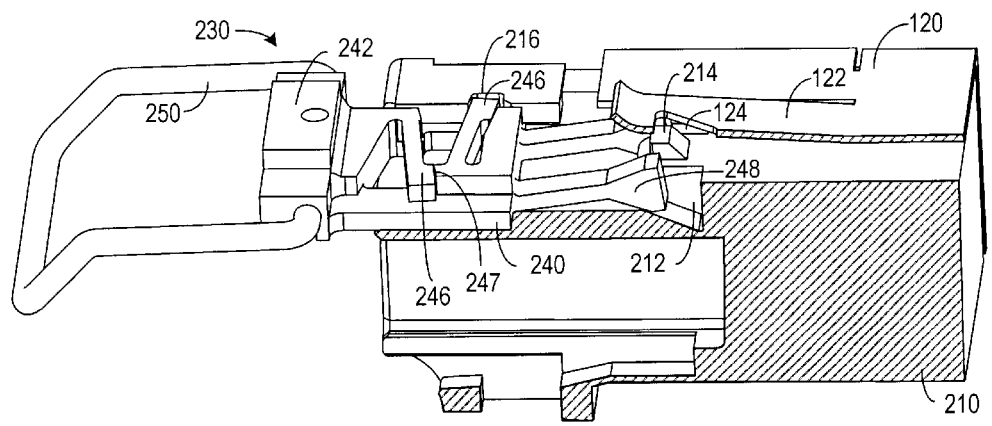

As shown in FIG. 2A, delatch mechanism 230 includes an integrated structure 240 and a bail 250. Integrated structure 240 can be molded or machined and includes features such as ridges 242 and 244, spring arms 246, and wedges 248. Bail 250 is friction fit through a hole in integrated structure 240 and can be flipped down as shown in FIG. 2A to keep bail out of the way, or flipped up as shown in FIG. 2B to extend out and facilitate pulling on delatch mechanism 230 during removal of module 210. Ridges 242 and 244 also provide grip points for pulling delatch mechanism 230 when bail 250 is down or is otherwise inconvenient for gripping. An LC fiber connector (not shown) can attach to module 210 through the center of bail 250.

Spring arms 246 have ends in notches 216 in module 210. (The cut away view of FIG. 2A shows only one of notches 216, the other notch being omitted to better illustrate integrated structure 240.) Spring arms 246 flex in response to a pulling force on delatch mechanism 230 and permit a limited range of motion for delatch mechanism 230 relative to module 210.

In the latched configuration, spring arms 246 can be uncompressed or have some spring loading, and wedges 248 reside in pockets 212 in module 210. Above wedges 248 is latch tab 122, half of which is illustrated in FIG. 2A. Through latch tab 122 is hole 124, in which post 214 resides when module 210 is latched in cage 120.

To remove module 210 from cage 120, an operator pulls out on delatch mechanism 230 via bail 250 or ridges 242 and/or 244. Initial pulling bends/flexes spring arms 246 and slides wedges 248 out of their respective pockets 212. As wedges 248 rise out of pockets 212, wedges 248 push up on latch tab 122.

FIG. 2B shows a configuration where spring arms 246 have reached a limit of their compression and wedges 248 have lifted latch tab 122 above post 214. In the embodiment of FIGS. 2A and 2B, spring arms 246 are at angles such that pulling on integrate structure 240 flexes spring arms 246 about their respective bases and extends the ends of spring arms 246 further into notches 216 in module 210. Accordingly, pulling more firmly engages spring arms 246 in notches 216. In the illustrated configuration of FIG. 2B, spring arms 246 contact fixed portions 247 of delatch mechanism 230 and cannot flex further. The pulling force thus acts on module 210 to slide module 210 out of cage 120.

Figure 3A:
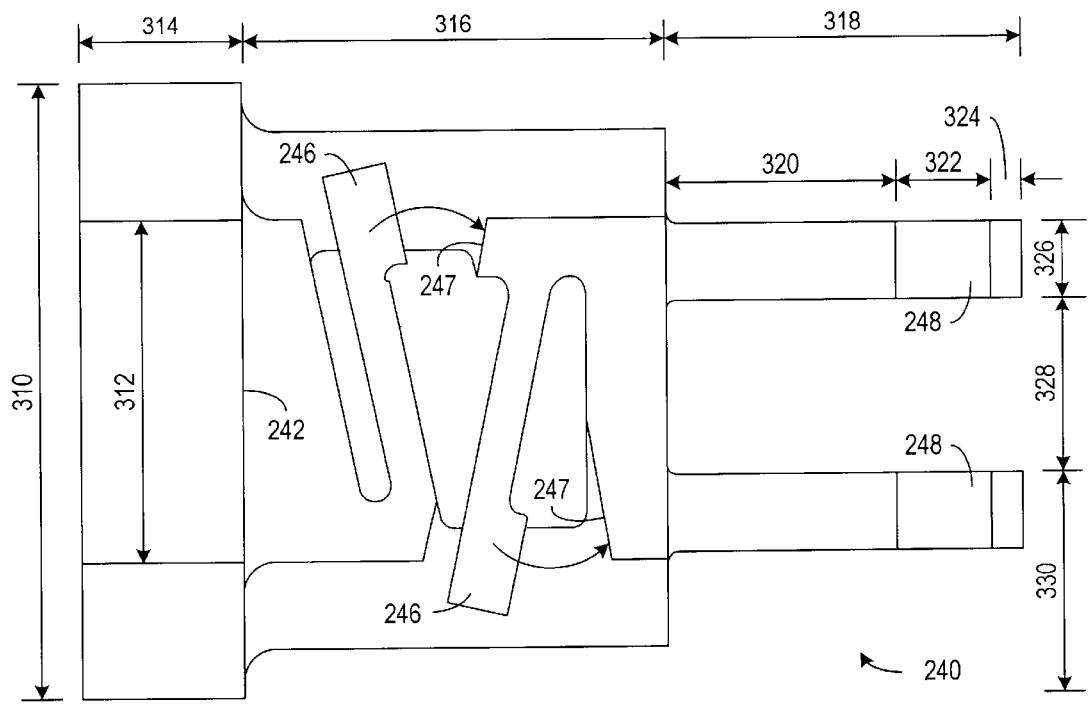
FIGS. 3A and 3B are respectively top and side views of the delatch mechanism of FIGS. 2A and 2B.
Figure 3B:
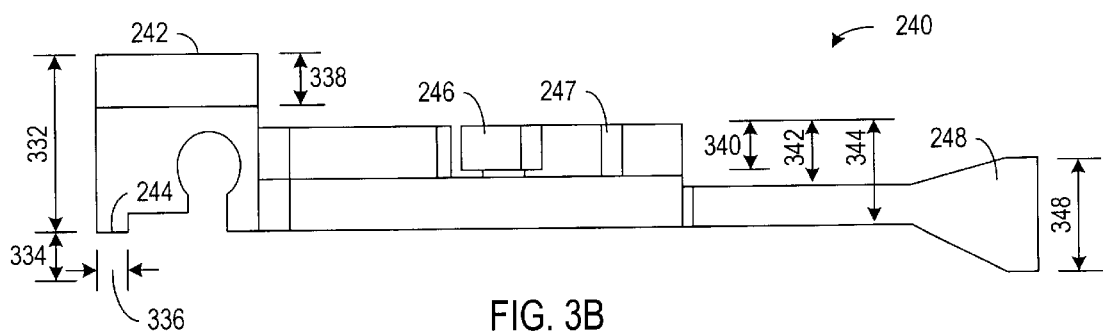

FIGS. 3A and 3B respectively show top and side view of integrated structure 240 when uncompressed. As noted above, when an operator pulls on integrated structure 240, spring arms 246, which are in notches in module 210, flex until encountering surfaces 247, which prevent further flexing of spring arms 246 and thereby transfer the pulling force to module 210. As illustrated, spring arms 246 are crossed at matching angles to provide a balanced force on module 210.

In an exemplary embodiment of the invention, integrated structure 240 has an overall length of about 14.8 mm, a width of about 9.7 mm, and a thickness of about 3.4 mm. Spring arms 246 are 12° from perpendicular to the direction of motion when uncompressed and rotate about 20° into contact with respective surfaces 247. Table 1 lists specific dimensions of the exemplary embodiment, with the listed dimensions being arranged by reference number in FIGS. 3A and 3B.

TABLE 1

Dimensions of Exemplary Embodiment

| Ref. No. | Dimension | Ref. No. | Dimension | Ref. No. | Dimension |
|---|---|---|---|---|---|
| 310 | 9.7 mm | 324 | 0.5 mm | 338 | 0.8 mm |
| 312 | 5.4 mm | 326 | 1.2 mm | 340 | 0.8 mm |
| 314 | 2.5 mm | 328 | 2.8 mm | 342 | 0.9 mm |
| 316 | 6.7 mm | 330 | 3.45 mm | 344 | 1.5 mm |
| 318 | 5.6 | 332 | 2.4 mm | 348 | 1.75 mm |
| 320 | 3.6 | 334 | 0.75 mm | | |
| 322 | 1.5 mm | 336 | 0.5 mm | | |

The exemplary embodiment of integrated structure 240 is made of a polymer material that can be molded with the required features and can withstand the temperature range specified for module 210. One suitable material is Zytel FR15 NC010 from Dupont, but many other materials can be used. In the exemplary embodiment, the material of integrated structure 240 should have a flexural modulus in a range between about 3000 to 5000 MPa, have a minimum tensile strength of 60 MPa, be able to withstand at least a 8.5% elongation, have a heat deflection temperature of at least 70° C., and have a UL-V0 rated flammability.

Figure 4:
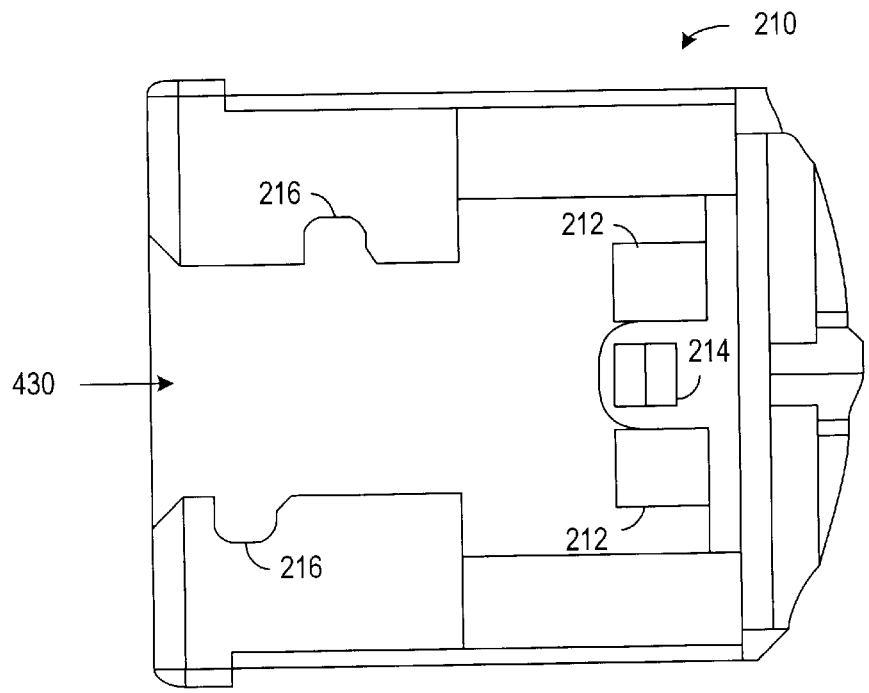
FIG. 4 is a top view of a portion of a fiber optic transceiver module adapted for a delatch mechanism in accordance with the embodiment of the invention illustrated in FIGS. 2A and 2B.

FIG. 4 is a top view of a portion of module 210 associated with delatch mechanism 230. As illustrated, module 210 includes a channel 430 having guide rails along both sides to guide movement of integrated structure 240. The dimensions of channel 430 and the associated guide rails can be the same as the dimensions of the matching structures in conventional modules such as module 110 of FIG. 1 so that module 210 can be used with either a pull-to-detach mechanism in accordance with the current invention or a standard push-to-detach mechanism of FIG. 1. However, along channel 430, module 210 (FIG. 4) includes notches 216 that are offset from each other to accommodate spring arms 246 of integrated structure 240 (FIG. 3A).

When assembling module 210 of FIG. 4 and integrated structure 240 of FIG. 3A to form the assembly of FIG. 2A, spring arms 246 can be lifted above the top of module 210 while sliding structure 240 into channel 430. Spring arms 246 drop down into notches 216 when structure 240 reaches the latched position.

Module 210 also includes pockets 212 in which respective wedges 248 reside when in the latched position. In the exemplary embodiment, pockets 212 include an incline at an angle (e.g., 24°) that is less than or equal to a bottom angle (e.g., 30°) of wedges 248 so that wedges 248 slide along their heels during the delatch operation that lifts latch tab 122.

As noted in the description of FIG. 2A, delatch mechanism 230 has a handle including bail 250 and ridges 242 and 244 that permit an operator to pull on the delatch mechanism 230 and remove module 210. Bail 250 preferably has a friction fit with integrated structure 240 so that bail 250 remains in any position (e.g., up or down) that the operator prefers. The delatch mechanism could alternatively employ a variety of other types of handles. For example, ridges 242 and 244 could be omitted in a system that relies solely on bail 250 when removing module 210.

Figure 5A:
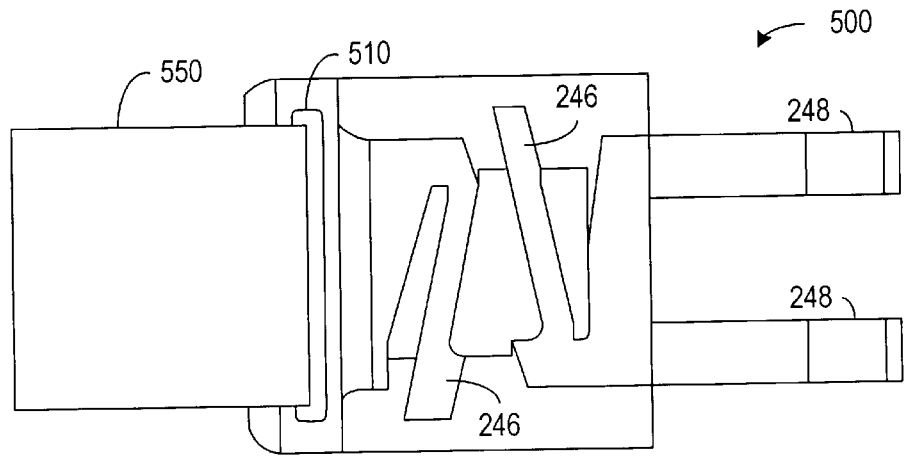
FIGS. 5A and 5B are respectively top and side views of an alternative delatch mechanism using a handle including a flexible tab.
Figure 5B:
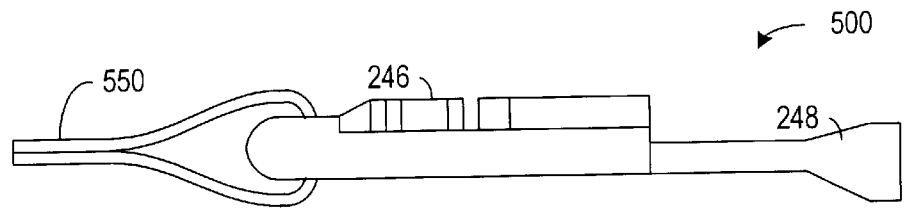

FIGS. 5A and 5B illustrate an alternative embodiment of an integrated structure 500 adapted for a handle including a flexible tab 550. Integrated structure 500 fits into the guided channel 430 of FIG. 4 in place of integrated structure 240 of FIG. 2A and includes spring arms 246 and wedges 248 that are substantially as described above. However, integrated structure 500 includes a slot 510 through which a strip of flexible material such as Mylar can be inserted. The strip when folded back on itself and glued or melded forms flexible tab 550 that can be pulled on to remove a module 210 from a cage 120. In one exemplary embodiment, a waffle-patterned heater melds ends of the looped strip together to provide a texture for better gripping of flexible tab 550.

Figure 6A:
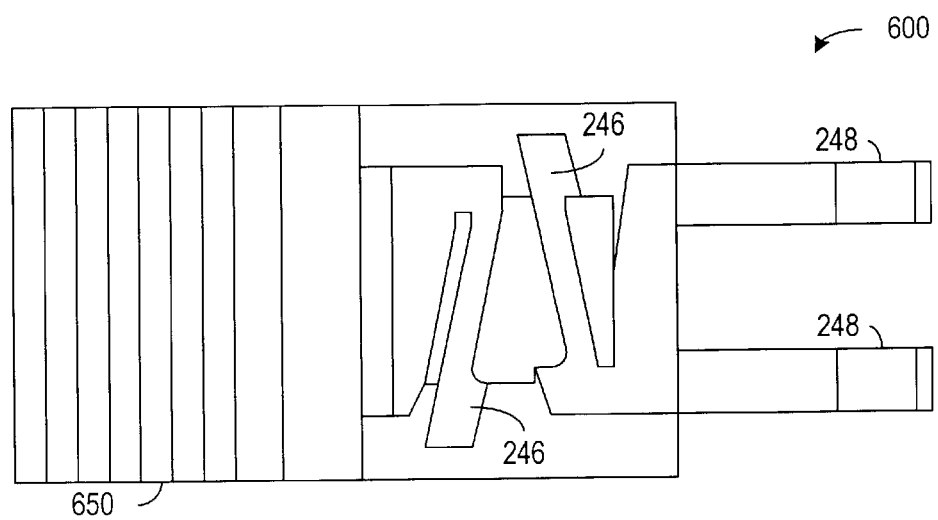
FIGS. 6A and 6B are respectively top and side views of an alternative delatch mechanism including a rigid handle that is part of an integrated structure including wedges and a spring system.
Figure 6B:
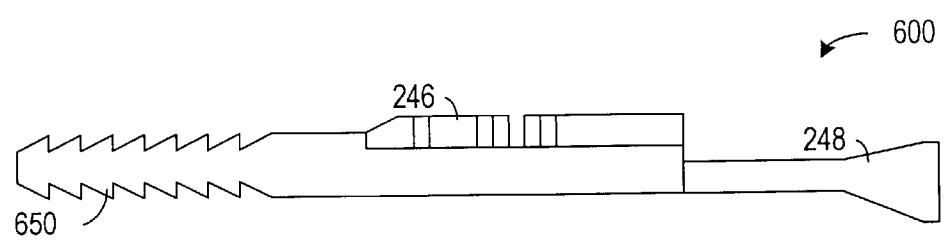

FIGS. 6A and 6B illustrate another alternative embodiment having an extended handle 650 as part of an integrated structure 600. Extended handle 650 can have a texture such as ridges that facilitate gripping and pulling on the delatch mechanism. Integrated structure 600 has the advantage of providing a delatch mechanism with a low part count and simple assembly because assembling the delatch mechanism with integrated structure 600 does not require a separate handle assembly operation.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A module assembly comprising:
   a module body including a latch post and a pocket adjacent the latch post, wherein the latch post and the pocket are features of a single integrated structure; and
   a delatch mechanism including a wedge with a top that is below a top of the latch post when the wedge is in the pocket, wherein the wedge rises out of the pocket so that the top of the wedge is at or above the top of the latch post when the delatch mechanism is pulled from a first position to a second position.

2. The assembly of claim 1, further comprising a handle that enables a user to pull on the delatch mechanism.

3. The assembly of claim 2, wherein the handle comprises a bail that is connected to an integrated structure that includes the wedge.

4. The assembly of claim 3, wherein the handle additionally comprises one or more ridges on the integrated structure, the ridges being accessible as an alternative to the bail.

5. The assembly of claim 2, wherein the handle comprises a portion of an integrated structure that includes the wedge.

6. The assembly of claim 1, wherein the module body and delatch mechanism are part of a fiber optic transceiver module.

7. A module assembly comprising:
   a module body including a latch post and a pocket adjacent the latch post;
   a delatch mechanism including a wedge with a top that is below a top of the latch post when the wedge is in the pocket, wherein the wedge rises out of the pocket so that the top of the wedge is at or above the top of the latch post when the delatch mechanism is pulled from a first position to a second position; and a spring system attached so that pulling the delatch mechanism from the first position to the second position compresses the spring system and transfers pulling force to the module body.

8. The assembly of claim 7, wherein:

the module body further comprises a channel having notches on opposite sidewalls; and the spring assembly comprises spring arms having ends in the notches.

9. The assembly of claim 8, wherein the spring arms and the wedge are portions of an integrated structure.

10. A module assembly comprising:

a module body including a latch post and a pocket adjacent the latch post;

a delatch mechanism including a wedge with a top that is below a top of the latch post when the wedge is in the pocket, wherein the wedge rises out of the pocket so that the top of the wedge is at or above the top of the latch post when the delatch mechanism is pulled from a first position to a second position; and a handle that enables a user to pull on the delatch mechanism, wherein the handle comprises a flexible tab that is looped though an opening in an integrated structure that includes the wedge.

11. A method for removing a module from a cage, comprising:

pulling a delatch mechanism from a first position to a second position relative to the module, wherein pulling the delatch mechanism from the first position to the second position pulls the wedge from a pocket in the module, causing the wedge to rise and lift a tab on the cage to free a post on the module from a hole in the tab; and after pulling the delatch mechanism to the second position, further pulling the delatch mechanism to slide the module out of the cage, wherein in the second position the delatch mechanism is fixed relative to the module so that the further pulling applies force to the module to remove the module from the cage.

12. The method of claim 11, wherein pulling the delatch mechanism from the first position to the second position causes a second wedge to rise, and the wedges cooperate to lift the tab on the cage and free the post.

13. A method for removing a module from a cage, comprising:

pulling a delatch mechanism from a first position to a second position relative to the module, wherein pulling the delatch mechanism from the first position to the second position moves a wedge causing the wedge to lift a tab on the cage to free a post on the module from a hole in the tab and compresses a spring system that transfers pulling force to the module; and after pulling the delatch mechanism to the second position, further pulling the delatch mechanism to slide the module out of the cage, wherein in the second position the delatch mechanism is fixed relative to the module so that the further pulling applies force to the module to remove the module from the cage.

14. The method of claim 13, wherein:

the module comprises a channel having notches on opposite sidewalls; and the spring system comprises spring arms having ends in the notches.

* * * * *